United States Patent
Shan

(10) Patent No.: US 11,047,978 B2
(45) Date of Patent: Jun. 29, 2021

(54) SYSTEM AND METHOD FOR GENERATING AN ELECTROMAGNETIC-PROFILE DIGITAL MAP

(71) Applicant: Tiejun Shan, Plano, TX (US)

(72) Inventor: Tiejun Shan, Plano, TX (US)

(73) Assignee: THE EUCLIDE 2012 INVESTMENT TRUST, Plano, TX (US)

( * ) Notice: Subject to any disclaimer, the term of this patent is extended or adjusted under 35 U.S.C. 154(b) by 4 days.

(21) Appl. No.: 16/676,428

(22) Filed: Nov. 6, 2019

(65) Prior Publication Data

US 2020/0072971 A1    Mar. 5, 2020

Related U.S. Application Data

(63) Continuation-in-part of application No. 16/248,761, filed on Jan. 15, 2019, now Pat. No. 10,795,014, and
(Continued)

(51) Int. Cl.
*G01S 13/931* (2020.01)
*G01C 21/36* (2006.01)
(Continued)

(52) U.S. Cl.
CPC ............ *G01S 13/931* (2013.01); *G01C 21/32* (2013.01); *G01C 21/3602* (2013.01);
(Continued)

(58) Field of Classification Search
CPC ... G01S 13/931; G01C 21/3602; G01C 21/32; G05D 1/0088; G05D 1/0274; G06K 9/00791
(Continued)

(56) References Cited

U.S. PATENT DOCUMENTS 7,974,460 B2    7/2011    Elgersma
8,874,360 B2    10/2014   Klinger et al.
(Continued)

FOREIGN PATENT DOCUMENTS

WO    WO2001050211 A2    7/2001

*Primary Examiner* — Bo Fan

(57) ABSTRACT

A method for generating an electromagnetic-profile digital map creates a visual map that includes all obstacles on the road, including road textures, other vehicles, and more. This is achieved by collecting data from specialized deployed vehicles for subsequent processing and compilation. The generated electromagnetic-profile digital map provides three dimensional geographic characteristics of a road, thus enabling automatic driving. The method further utilizes artificial intelligence technology that can improve an autopilot role in automatic driving. Electromagnetic (EM) profiles acquire and analyze data to provide powerful tools for various wireless vehicular communication services. The method utilizes both compiled digital geographical characteristics (location, road futures, including curvature, condition, and more), and surrounding features (3D images, elevations, traffic light location, speed limit, EM propagation profile, and more) to render road conditions. Machine learning patterns are utilized to update the EM propagation profile map.

11 Claims, 18 Drawing Sheets

Related U.S. Application Data a continuation-in-part of application No. 16/242,958, filed on Jan. 8, 2019, now Pat. No. 11,002,828, and a continuation-in-part of application No. 16/249,351, filed on Jan. 16, 2019, now Pat. No. 10,794,988, and a continuation-in-part of application No. 16/252,257, filed on Jan. 18, 2019, now Pat. No. 10,827,341, and a continuation-in-part of application No. 16/252,377, filed on Jan. 18, 2019, now Pat. No. 10,823,837, and a continuation-in-part of application No. 16/271,567, filed on Feb. 8, 2019, now Pat. No. 10,794,989, and a continuation-in-part of application No. 16/276,288, filed on Feb. 14, 2019, now Pat. No. 10,805,022, and a continuation-in-part of application No. 16/672,417, filed on Nov. 1, 2019, now Pat. No. 10,871,571.

(60) Provisional application No. 62/617,962, filed on Jan. 16, 2018, provisional application No. 62/616,844, filed on Jan. 12, 2018, provisional application No. 62/756,318, filed on Nov. 6, 2018, provisional application No. 62/617,723, filed on Jan. 16, 2018, provisional application No. 62/618,735, filed on Jan. 18, 2018, provisional application No. 62/619,204, filed on Jan. 19, 2018, provisional application No. 62/628,436, filed on Feb. 9, 2018, provisional application No. 62/630,416, filed on Feb. 14, 2018, provisional application No. 62/754,448, filed on Nov. 1, 2018.

(51) Int. Cl.
  *G01C 21/32* (2006.01)
  *G05D 1/00* (2006.01)
  *G06K 9/00* (2006.01)
  *G05D 1/02* (2020.01)

(52) U.S. Cl.
  CPC ......... *G05D 1/0088* (2013.01); *G05D 1/0274* (2013.01); *G06K 9/00791* (2013.01)

(58) Field of Classification Search
  USPC ........................................................ 342/107
  See application file for complete search history.

(56) References Cited

U.S. PATENT DOCUMENTS

| | | |
|---|---|---|
| 9,566,983 B2 | 2/2017 | Harda |
| 9,922,563 B2 | 3/2018 | Bostick et al. |
| 2016/0223643 A1* | 8/2016 | Li .......................... G01S 13/931 |

* cited by examiner

SYSTEM AND METHOD FOR GENERATING AN ELECTROMAGNETIC-PROFILE DIGITAL MAP

The current application claims a priority to the U.S. Provisional Patent application Ser. No. 62/756,318 filed on Nov. 6, 2018.

The current application also claims a priority to a U.S. non-provisional application Ser. No. 16/672,417 filed on Nov. 1, 2019. The U.S. non-provisional application Ser. No. 16/672,417 claims a priority to the U.S. Provisional Patent application Ser. No. 62/754,448 filed on Nov. 1, 2018.

The current application also claims a priority to a U.S. non-provisional application Ser. No. 16/276,288 filed on Feb. 14, 2019. The U.S. non-provisional application Ser. No. 16/276,288 claims a priority to the U.S. Provisional Patent application Ser. No. 62/630,416 filed on Feb. 14, 2018.

The current application also claims a priority to a U.S. non-provisional application Ser. No. 16/271,567 filed on Feb. 8, 2019. The U.S. non-provisional application Ser. No. 16/271,567 claims a priority to the U.S. Provisional Patent application Ser. No. 62/628,436 filed on Feb. 9, 2018.

The current application also claims a priority to a U.S. non-provisional application Ser. No. 16/252,377 filed on Jan. 18, 2019. The U.S. non-provisional application Ser. No. 16/252,377 claims a priority to the U.S. Provisional Patent application Ser. No. 62/619,204 filed on Jan. 19, 2018.

The current application also claims a priority to a U.S. non-provisional application Ser. No. 16/252,257 filed on Jan. 18, 2019. The U.S. non-provisional application Ser. No. 16/252,257 claims a priority to the U.S. Provisional Patent application Ser. No. 62/618,735 filed on Jan. 18, 2018.

The current application also claims a priority to a U.S. non-provisional application Ser. No. 16/249,351 filed on Jan. 16, 2019. The U.S. non-provisional application Ser. No. 16/249,351 claims a priority to a U.S. provisional application Ser. No. 62/617,723 filed on Jan. 16, 2018.

The current application also claims a priority to a U.S. non-provisional application Ser. No. 16/248,761 filed on Jan. 15, 2019. The U.S. non-provisional application Ser. No. 16/248,761 claims a priority to a U.S. provisional application Ser. No. 62/617,962 filed on Jan. 16, 2018.

FIELD OF THE INVENTION

The present invention generally relates to a digital mapping system. More specifically, the present invention not only retains and displays features of current digital maps, including road geophysical position, road characters, and even three-dimensional images, but also has a supplemental electromagnetic (EM) propagation profile map for various wavelengths.

BACKGROUND OF THE INVENTION

Wireless communication networks and automatic radar systems for self-driving vehicles has been a fast-growing area of interest for many automobile and wireless enterprises. These markets are among fast growing markets in the world. Recently, the development of auto radar provides a sensing tool for advanced driver-assistance systems (ADAS) and automatic driving are the focus of automobile manufacture and artificial intelligence (AI) research and development industry. However, current systems often fail due to an inability to communicate effectively car-to-car in crowded or obstructed conditions. For example, a sharp turn in a mountainous highway, as represented in FIG. 1, prevents direct impingement between two cars, as the cars are hidden from each other on the other side of the sharp turn. It is difficult to receive any radar echoes from the vehicles from the other side of the hill either from direct pass, or via a multipath. The radar echo signal from the incoming vehicle can only be detected via a scattering, weak EM wave that might be undetectable. In this case, the ADAS and automatic radar detection will fail, or at least the detectability of the target is greatly compromised, especially for millimeter wave band radar. Further, systems fail to accurately communicate and display road conditions as conditions change over time due to fatigue and incident. Radio detection and ranging (radar) is one of the sensing devices needed for ADAS and automatic driving. Unfortunately, automobile radar and vehicle wireless systems for vehicle-to-everything (V2X) face great challenges accounting for many geographic road features both in rural and urban areas.

The present invention addresses these issues. An electromagnetic-profile digital map provides three dimensional geographic characteristics of a road, thus enabling automatic driving. The present invention further utilizes AI technology that can improve an autopilot role in automatic driving and for ADAS. EM profiles cover wavelengths ranging from 800 MHz up to 77 GHz to provide powerful tools for various wireless communication services, vehicular radar and V2X systems. The present invention utilizes both compiled digital geographical characteristics (location, road futures, including curvature, condition, and more), and surrounding features (3D images, elevations, traffic light location, speed limit, EM propagation profile, and more) to render road conditions. Artificial intelligence or machine learning patterns are utilized to update the EM propagation profile map.

Urban road geometry, as represented in FIG. 2, presents a challenge in which there is no direct path for auto radar target reflect signal. Besides, there are many multipath signals from surrounding buildings, and from many radiation sources that may or may not be in the same frequency band. Therefore, it presents a great challenge for auto radar target detection and mobile vehicular communication. Many multipath signals are from fixed surrounding object. The EM digital map will greatly eliminate the adverse effect on the radar detection, mobile communication, and V2X communication systems. The present invention makes automatic driving possible in all geometric environments that may present a great challenge for automatic driving, ADAS system and Radar and Lidar detection. Further, the present invention makes it possible for mobile vehicular communication mechanisms, such as 5G, 4G vehicular networks and Wi-Fi networks to eliminate dead or weak points or areas while simultaneously increasing mobile vehicular network capacity and data rate.

DETAILED DESCRIPTION OF THE INVENTION

Figure 1:
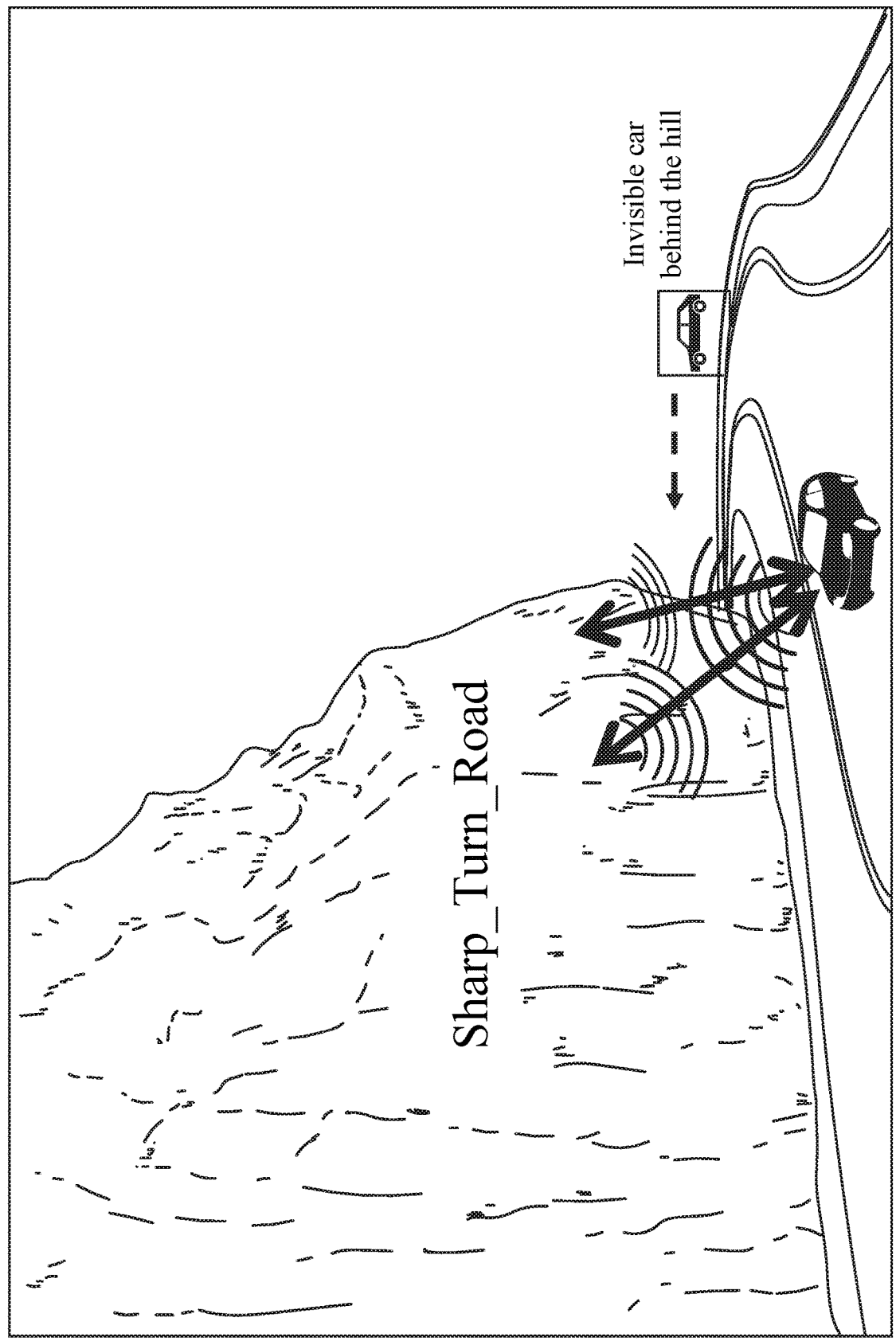
FIG. 1 is a schematic diagram illustrating a sharp turn.
Figure 2:
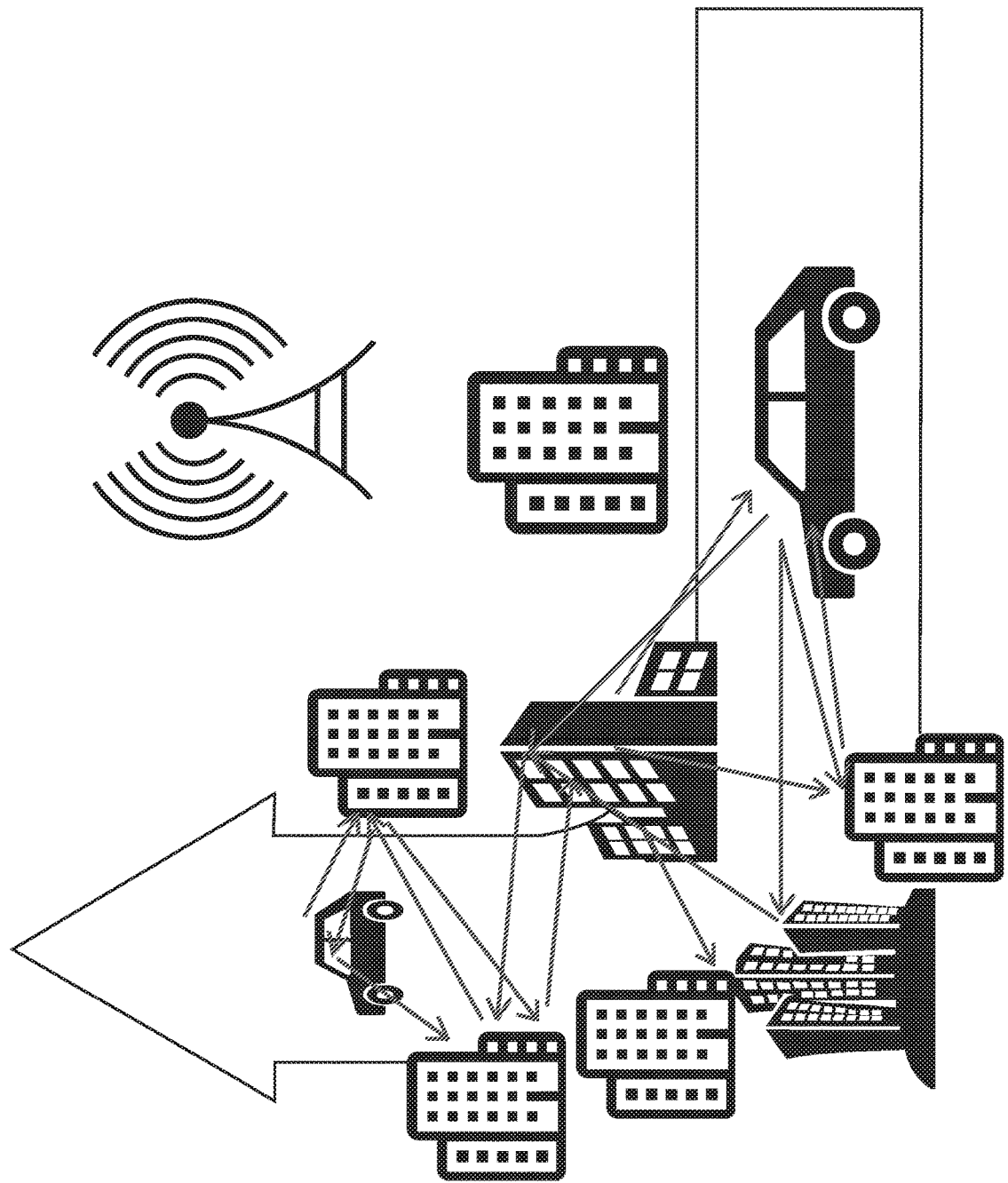
FIG. 2 is a schematic diagram illustrating radio detection and ranging (radar) usage in a city.

All illustrations of the drawings are for the purpose of describing selected versions of the present invention and are not intended to limit the scope of the present invention.

The present invention is a method for generating an electromagnetic-profile digital map that provides a user with an electromagnetic-profile of an entire geographic area that includes all obstacles on the road, including road textures, other vehicles, and more. Referring to FIG. 1-9, the present invention accomplishes this by analyzing data from vehicles deployed to collect test data about a plurality of points along the road. The system of the present invention includes at least one radio detection and ranging (radar)-enabled vehicle and an automated driving system (Step A). The radar-enabled vehicle relates to any automobile capable of positioning an array of sensors adjacent to a road while moving. The automated driving system is any type of fixed and mobile setup of devices and/or mechanisms that allow for the automatic driving of vehicles. The radar-enabled vehicle and the automated driving system are communicably coupled to each other. This arrangement enables transmission of data between the radar-enabled vehicle and the automated driving system. A plurality of geographic classifications is stored on the automated driving system. Each geographic classification is a type of EM profile that represents one or more specific geographic features such as, but not limited to, terrain, road quality, road age, proximity to hazards, and proximity to populated areas.

The present invention follows an overall process order to leverage the provided tools. To this end, a plurality of electromagnetic (EM) profiles is captured along a specific road with the radar-enabled vehicle by travelling the specific road with the radar-enabled vehicle (Step B). The plurality of EM profiles is a set of data regarding the topology and distribution of various points along a road. The specific road is a single path connecting two points on a map capable of supporting a vehicle and communicating various road laws. The specified road is mapped in a plurality of geospatial points, which is a set of global or relative coordinates capable of denoting the precise location of a point or defined section of a road. Each EM profile is associated to a corresponding point from the plurality of geospatial points, which allows each EM profile to be mapped along the specific road by their geospatial location. Each EM profile is next assigned to a corresponding classification with the automated driving system (Step C), wherein the corresponding classification is from the plurality of geographic classifications. This provides each EM profile with relevant supplemental information about the documented area, thus enabling application of the captured data to a digital map. A plurality of iterations for Steps B and C is executed for a plurality of mapped roads, wherein the specific road in each iteration for Steps B and C is a different road from the plurality of mapped roads (Step D). In this way, a comprehensive set of mapping data can be generated for all of the roads within a designated geographic area. Each EM profile is compiled with the corresponding classification at the corresponding point for each mappable road into an EM digital map of the plurality of mapped roads with the automated driving system (Step E). Thus, a fully comprehensive digital map, including the new data regarding the road, is generated. Finally, the EM digital map is implemented with the automated driving system (Step F). In this way, relevant, up-to-date information is provided to any automated driving service. In an alternative embodiment, such information is further provided directly to the vehicle operator.

Figure 10:
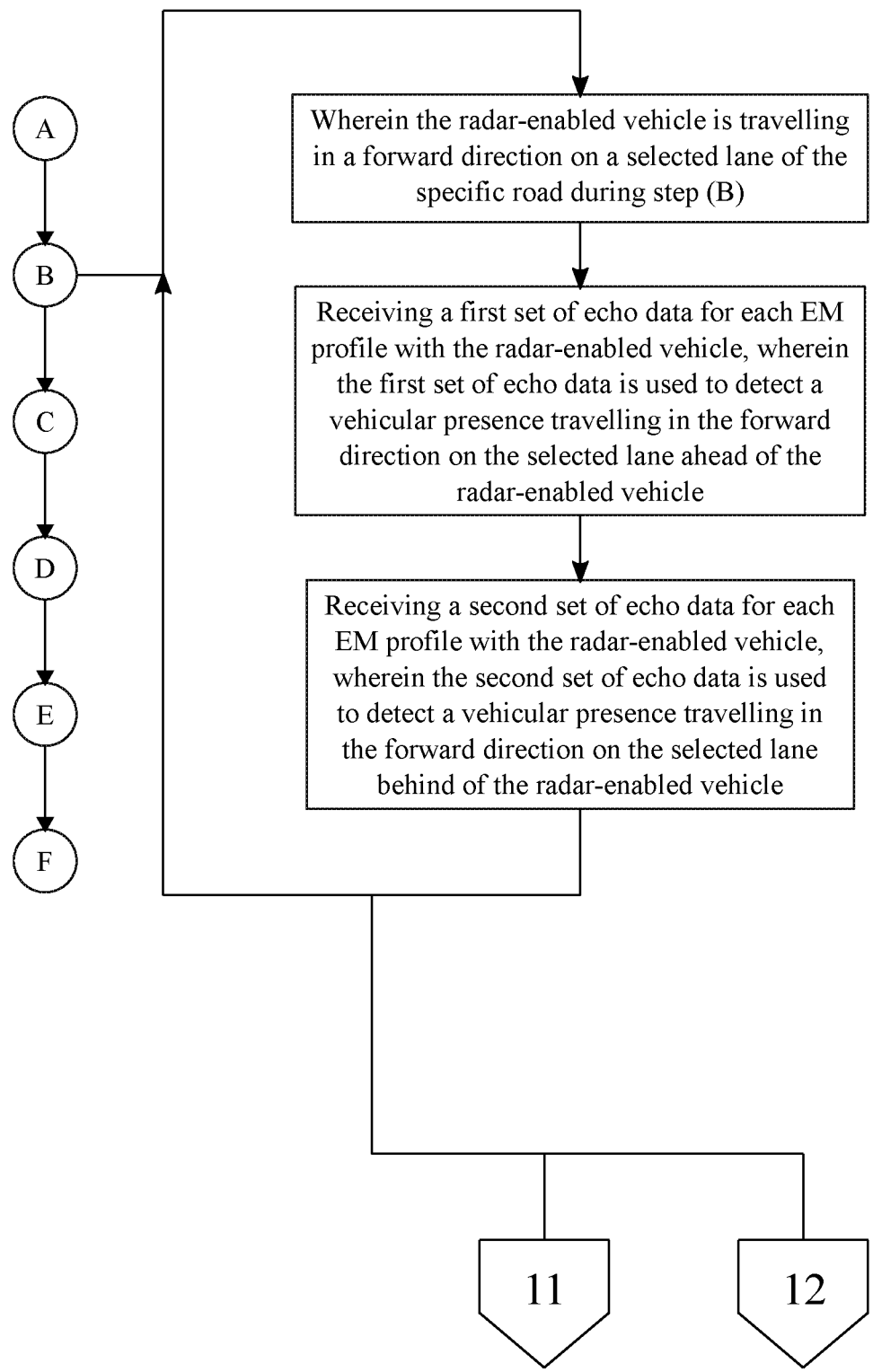
FIG. 10 is a flowchart illustrating the subprocess of detecting other vehicles in the same lane.

The radar-enabled vehicle may be traveling on a road in proximity to other vehicles. To account for one such arrangement of vehicles, the radar-enabled vehicle is travelling in a forward direction on a selected lane of the specific road during Step B, as represented in FIG. 10. The radar-enabled vehicle may be traveling upon any defined lane of the road of interest. A first set of echo data for each EM profile is received with the radar-enabled vehicle, wherein the first set of echo data is used to detect a vehicular presence travelling in the forward direction on the selected lane ahead of the radar-enabled vehicle. Thus, the radar-enabled vehicle is provided with the location of one or several vehicles ahead of the radar-enabled vehicle so that the automated driving system can eventually distinguish between those vehicles and static objects near the specific road. A second set of echo data is received for each EM profile with the radar-enabled vehicle, wherein the second set of echo data is used to detect a vehicular presence travelling in the forward direction on the selected lane behind of the radar-enabled vehicle. Thus, the radar-enabled vehicle is provided with the location of one or several vehicles behind the radar-enabled vehicle, so that the automated driving system can again eventually distinguish between those vehicles and static objects near the specific road. Such positional data is crucial to improving the effectiveness of automated driving systems.

Figure 11:
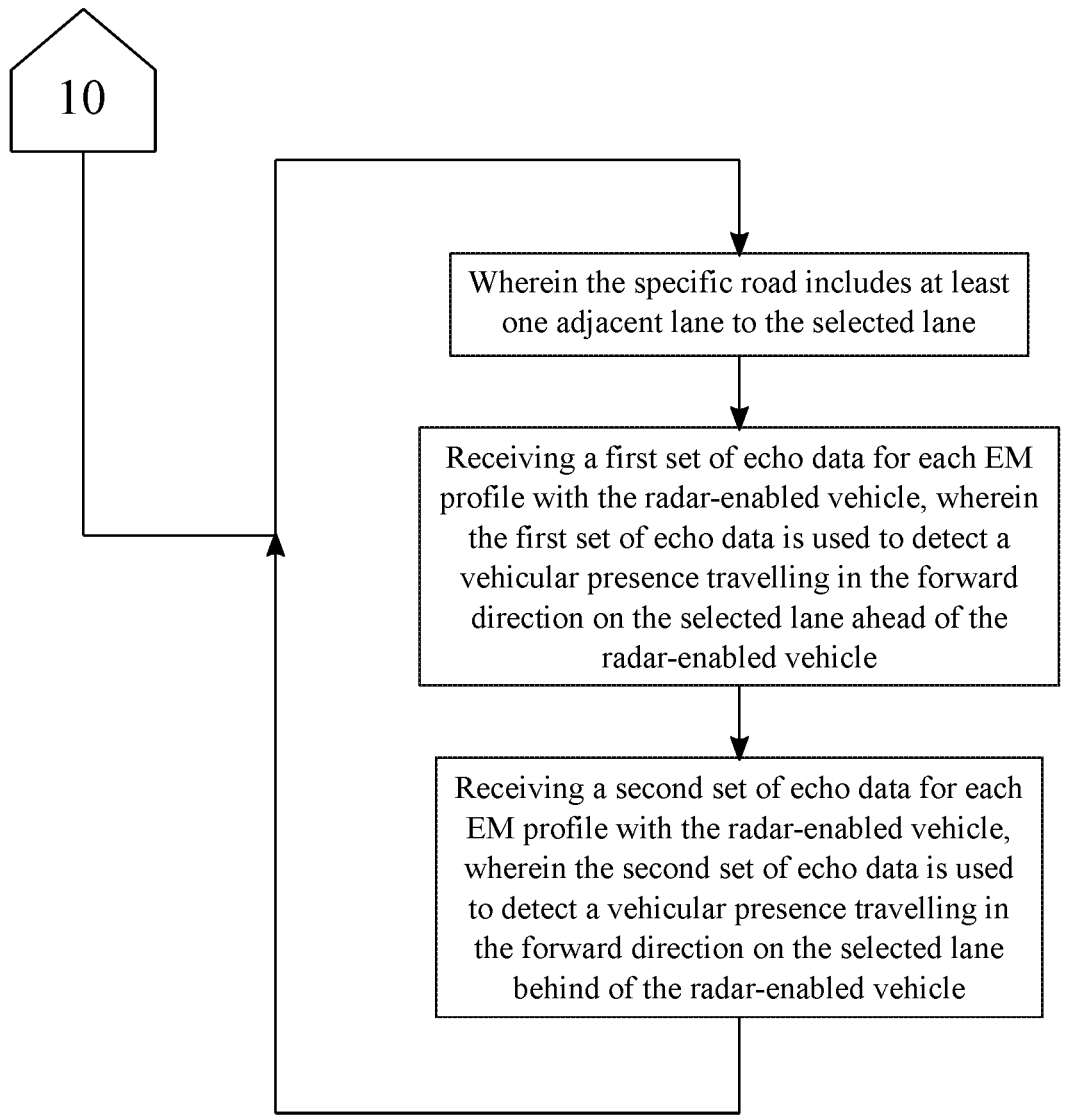
FIG. 11 is a flowchart illustrating the subprocess of detecting other vehicles in a different lane moving in the same direction.

In many scenarios, a road must be wide enough to accommodate heavier traffic flow. To adjust for this possibility, the specific road includes at least one adjacent lane to the selected lane, as represented in FIG. 11. The specific road may, in this case, be a multi-lane highway, a busy urban intersection, or a variety of other common road configurations. A third set of echo data for each EM profile is received with the radar-enabled vehicle, wherein the third set of echo data is used to detect a vehicular presence travelling in the forward direction on the adjacent lane ahead of the radar-enabled vehicle. Thus, the radar-enabled vehicle is equipped to monitor vehicles that are diagonally ahead, so that the automated driving system can again eventually distinguish between those vehicles and static objects near the specific road. A fourth set of echo data for each EM profile is received with the radar-enabled vehicle, wherein the fourth set of echo data is used to detect a vehicular presence travelling in the forward direction on the adjacent lane behind the radar-enabled vehicle. This arrangement enables the radar-enabled vehicle to monitor vehicles that are diagonally behind so that the automated driving system can again eventually distinguish between those vehicles and static objects near the specific road.

Figure 12:
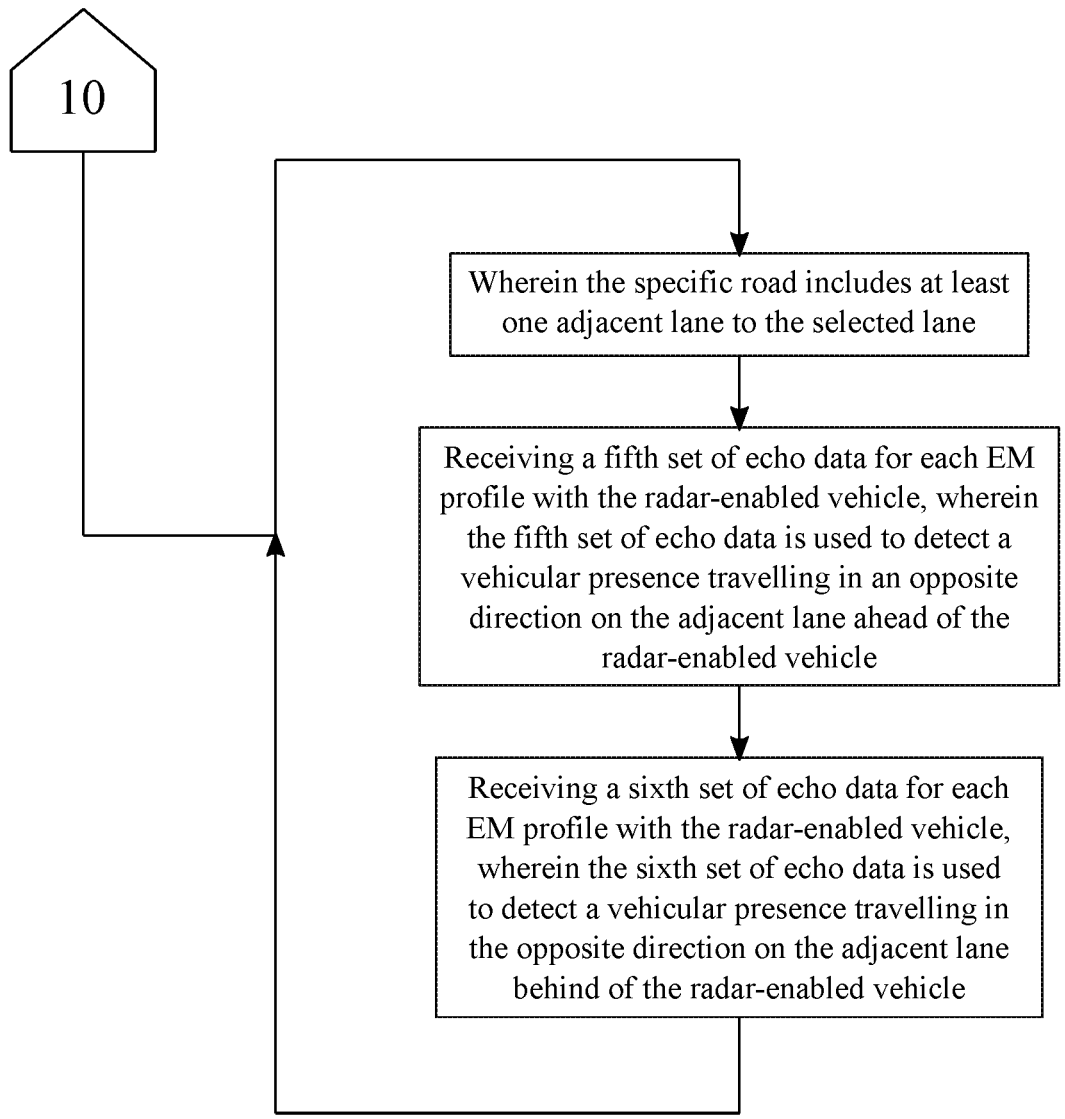
FIG. 12 is a flowchart illustrating the subprocess of detecting other vehicles in a different lane moving in the opposite direction.

It is further likely that the radar-enabled vehicle is traveling on a road with traffic in the opposite direction in the immediately adjacent lane. To allow the radar-enabled vehicle to respond to such a scenario, the specific road includes at least one adjacent lane to the selected lane, as represented in FIG. 12. The at least one adjacent lane may be to the left or to the right of the driver depending upon the laws of the country. A fifth set of echo data for each EM profile is received with the radar-enabled vehicle, wherein the fifth set of echo data is used to detect a vehicular presence travelling in an opposite direction on the adjacent lane ahead of the radar-enabled vehicle. Thus, the radar-enabled vehicle is equipped to monitor to cars that are diagonally ahead so that the automated driving system can again eventually distinguish between those vehicles and static objects near the specific road. A sixth set of echo data for each EM profile is received with the radar-enabled vehicle, wherein the sixth set of echo data is used to detect a vehicular presence travelling in the opposite direction on the adjacent lane behind of the radar-enabled vehicle. Thus, the radar-enabled vehicle is equipped to monitor to cars that are diagonally behind so that the automated driving system can again eventually distinguish between those vehicles and static objects near the specific road.

Figure 13:
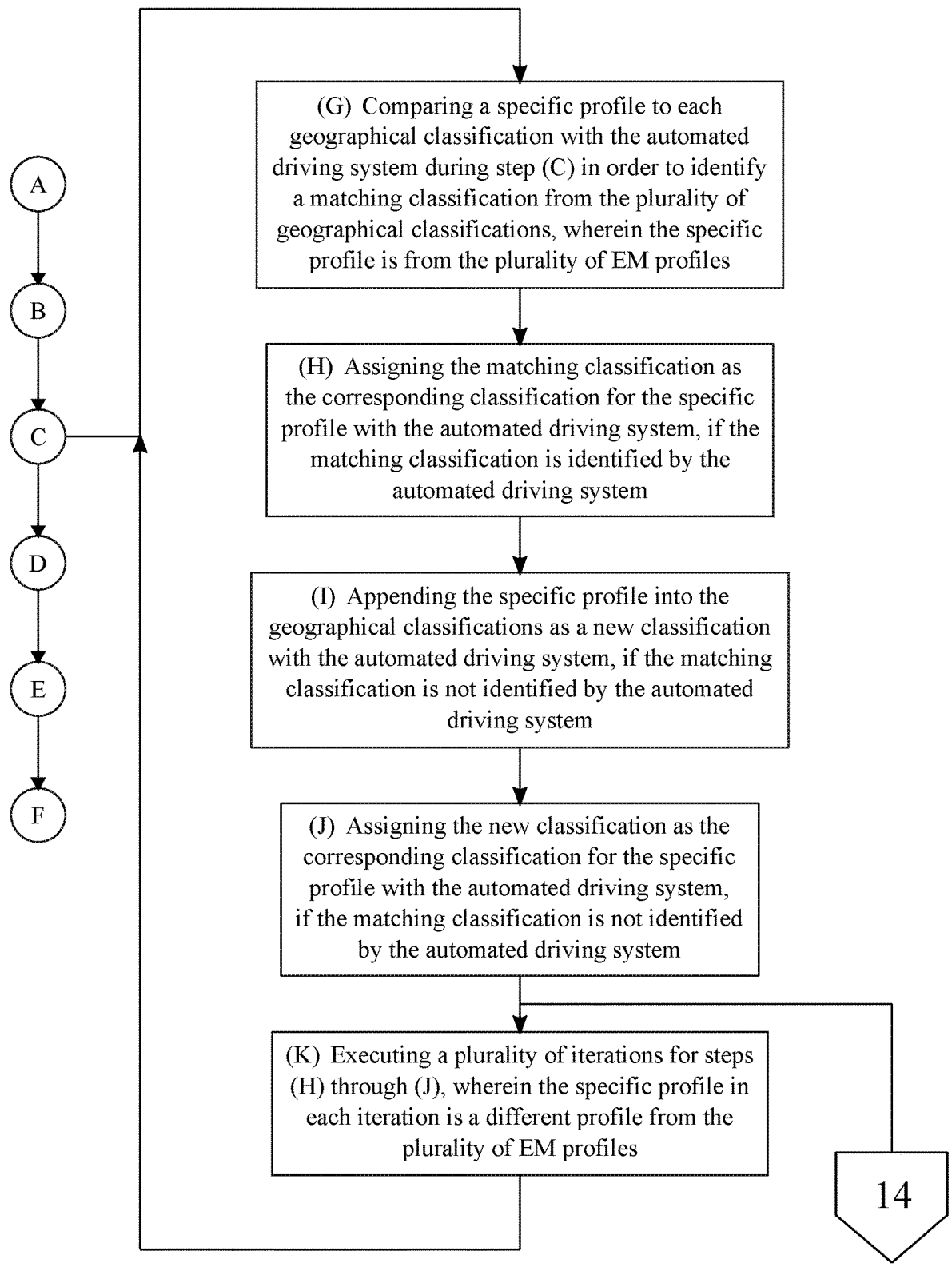
FIG. 13 is a flowchart illustrating the subprocess of geographically classifying EM profiles.

The geographic classification system described briefly in Step C may work in conjunction with an EM profile to determine topology and road conditions. To this end, a specific profile is compared to each geographical classification with the automated driving system in order to identify a matching classification from the plurality of geographical classifications, wherein the specific profile is from the plurality of EM profiles (Step G), as represented in FIG. 13. Comparing the specific profile to each geographical classification allows for the determination of differences for subsequent analysis. The matching classification is assigned as the corresponding classification for the specific profile with the automated driving system, if the matching classification is identified by the automated driving system (Step H). Thus, the corresponding classification may be subsequently utilized in the determination of relevant road features. The specific profile is appended into the geographical classifications as a new classification with the automated driving system, if the matching classification is not identified by the automated driving system (Step I). This arrangement enables the addition of new types of objects and features of the road into the automated driving system. The new classification is assigned as the corresponding classification for the specific profile with the automated driving system, if the matching classification is not identified by the automated driving system (Step J). In this way, unexpected objects are noted and processed in relation to the digital map. Finally, a plurality of iterations is executed for Steps H through J, wherein the specific profile in each iteration is a different profile from the plurality of EM profiles (Step K). Thus, all of the EM profiles are geographically classified along the specific road.

Figure 14:
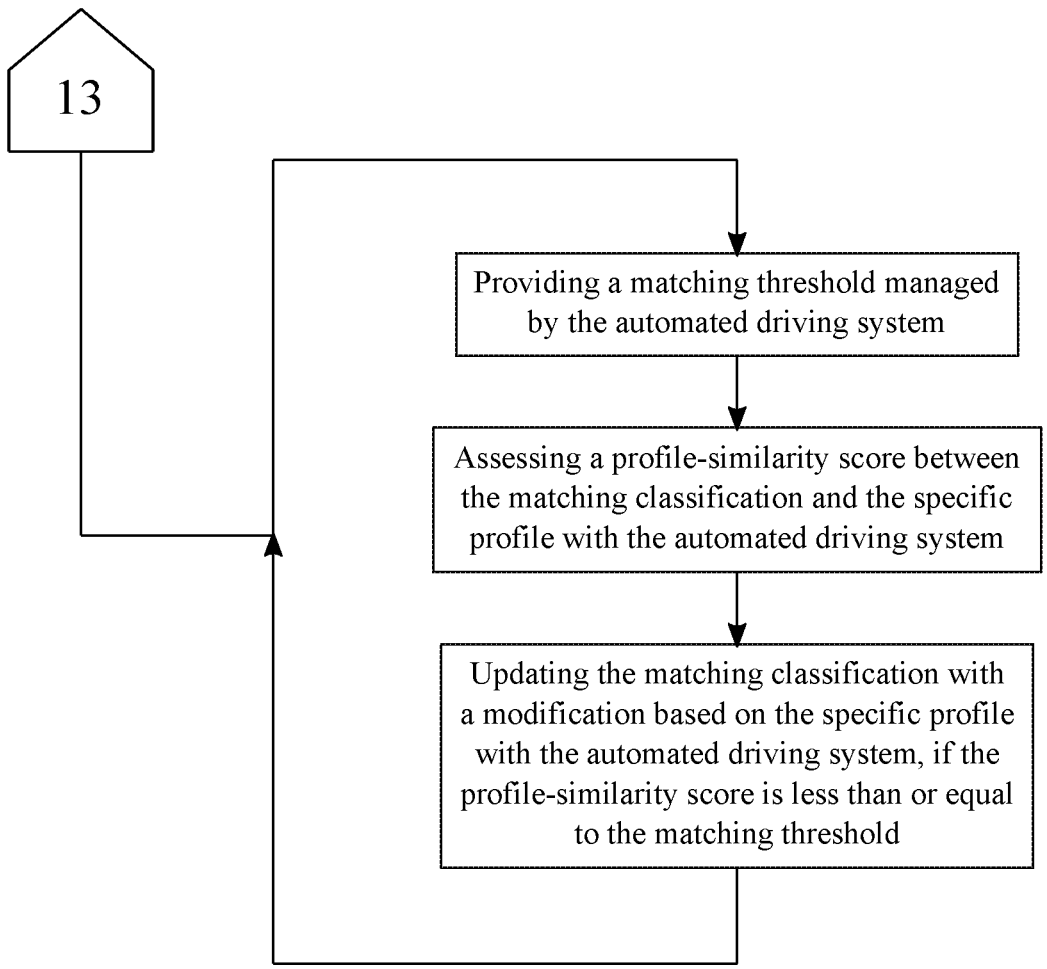
FIG. 14 is a flowchart illustrating the subprocess of updating a geographic classification.

The system requires a mechanism by which to compare and recognize road features. To this end, a matching threshold managed by the automated driving system is provided, as represented in FIG. 14. The matching threshold is the minimum amount of similarities that need to be shared between an EM profile and a geographical classification in order for the geographical classification to be designated as a matching classification for the EM profile. A profile-similarity score between the matching classification and the specific profile is assessed with the automated driving system. In this way, the automated driving system generates a value related to the similarity of the matching classification to the specific profile. The matching classification is next updated with a modification based on the specific profile with the automated driving system, if the profile-similarity score is less than or equal to the matching threshold. In this way, automated driving system is able to refine and update each geographical classification.

Figure 15:
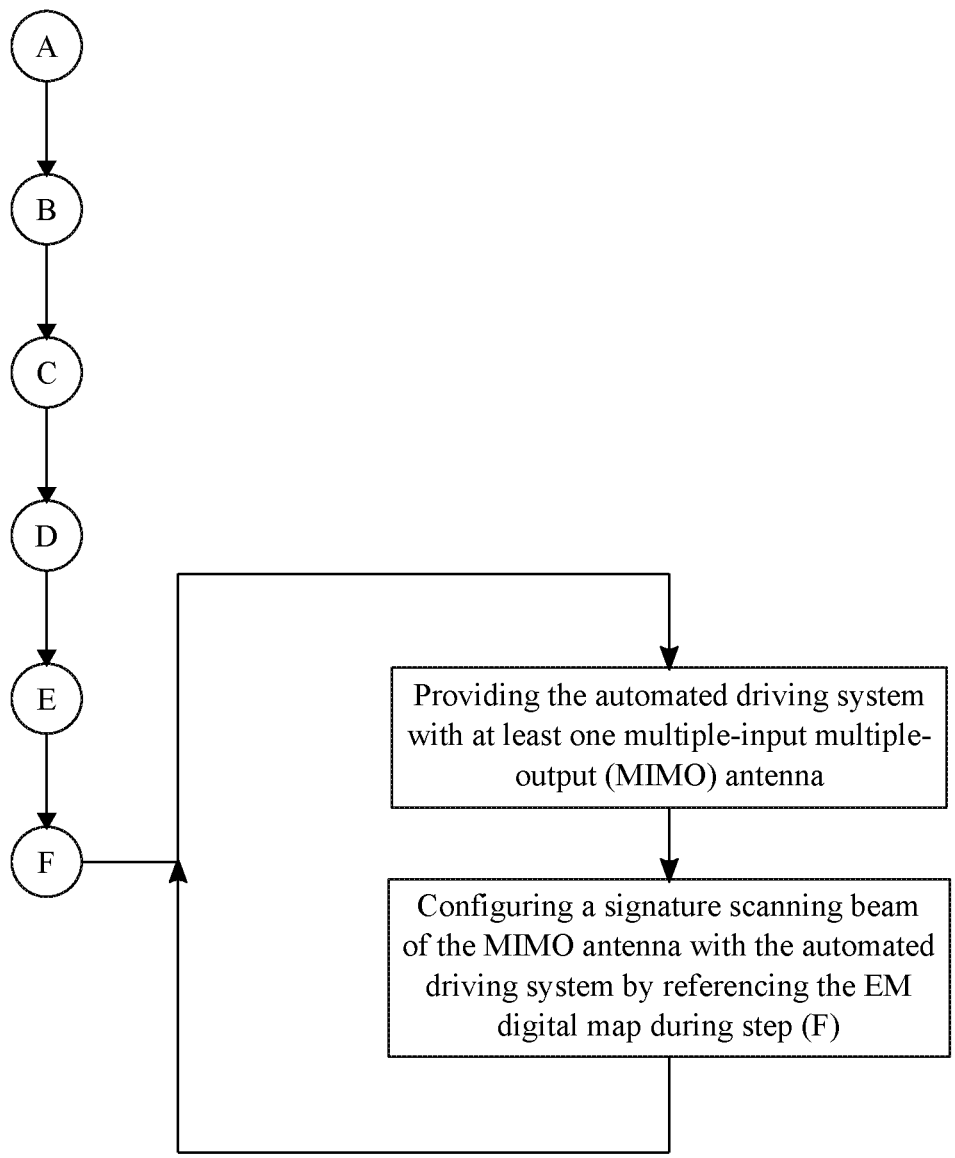
FIG. 15 is flowchart illustrating the subprocess of configuring a signature beam of a MIMO antenna.

The present invention may utilize a variety of devices in order to obtain and distribute collected information. The automated driving system is thus provided with at least one multiple-input multiple-output (MIMO) antenna, as represented in FIG. 15. The MIMO antenna is a device capable of performing a practical technique for sending and receiving more than one data signal simultaneously over the same radio channel by exploiting multipath propagation. A signature scanning beam of the MIMO antenna is configured with the automated driving system by referencing the EM digital map. The signature scanning beam contains data to be received or transmitted as relevant, along with a unique identifier key enabling encryption and decryption.

Figure 16:
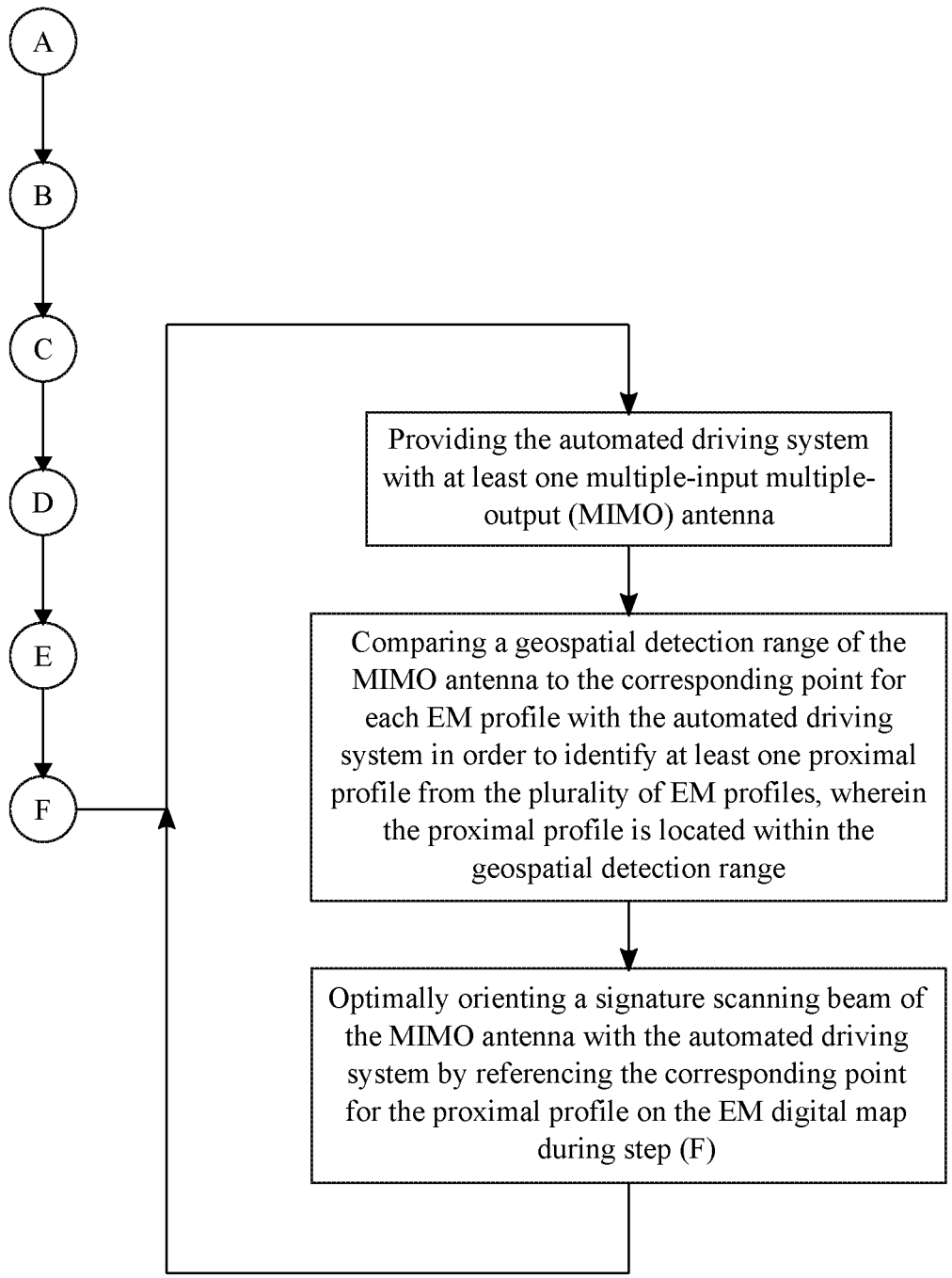
FIG. 16 is a flowchart illustrating the subprocess of configuring an optimal scanning beam for a MIMO antenna.

The automated driving system must further be equipped to perform scanning operations in a highly efficient manner. To improve the efficacy of the data collection and transfer process, the automated driving system is thus provided with at least one MIMO antenna, as represented in FIG. 16. The MIMO antenna is a device capable of performing a practical technique for sending and receiving more than one data signal simultaneously over the same radio channel by exploiting multipath propagation. A geospatial detection range of the MIMO antenna is compared to the corresponding point for each EM profile with the automated driving system in order to identify at least one proximal profile from the plurality of EM profiles, wherein the proximal profile is located within the geospatial detection range. This arrangement enables determination of an EM profile within the working range of the MIMO antenna. A signature scanning beam of the MIMO antenna is optimally oriented with the automated driving system by referencing the corresponding point for the proximal profile on the EM digital map during Step F. This allows the signature scanning beam to be directed in a way to maximize its detection capabilities.

Figure 17:
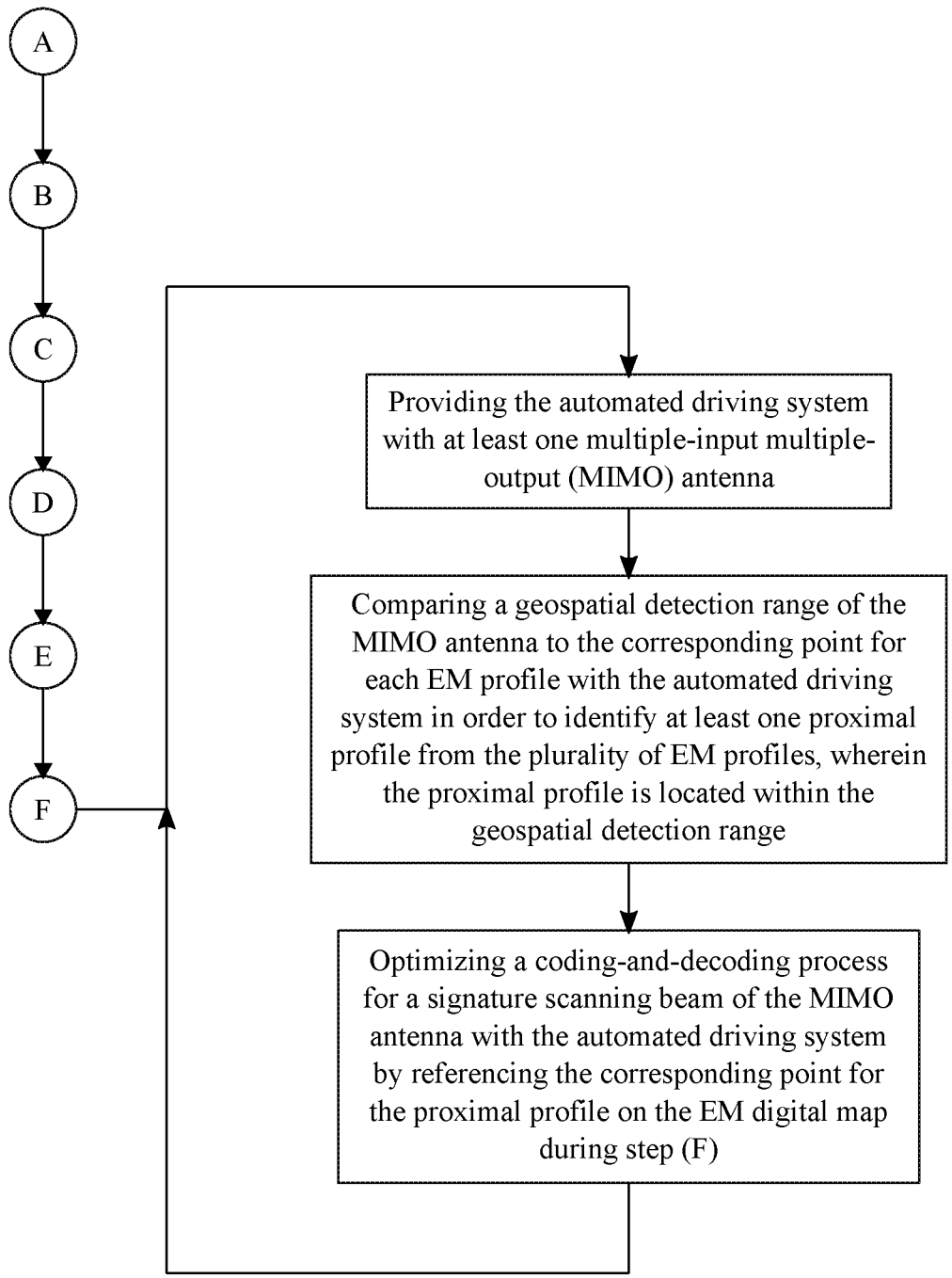
FIG. 17 is a flowchart illustrating the subprocess of optimizing a coding-and-decoding process for the MIMO antenna.

The present invention further benefits from the ability to codify data for secure transmission. To enable this process, the automated driving system is provided with at least one MIMO antenna, as represented in FIG. 17. The MIMO antenna is a device capable of performing a practical technique for sending and receiving more than one data signal simultaneously over the same radio channel by exploiting multipath propagation. A geospatial detection range of the MIMO antenna is compared to the corresponding point for each EM profile with the automated driving system in order to identify at least one proximal profile from the plurality of EM profiles, wherein the proximal profile is located within the geospatial detection range. This arrangement enables determination of an EM profile within the working range of the MIMO antenna. A coding-and-decoding process for a signature scanning beam of the MIMO antenna is optimized with the automated driving system by referencing the corresponding point for the proximal profile on the EM digital map during Step F. The coding-and-decoding process is any of a variety of data encryption and decryption mechanisms by which information may be identified and securely transmitted.

Figure 18:
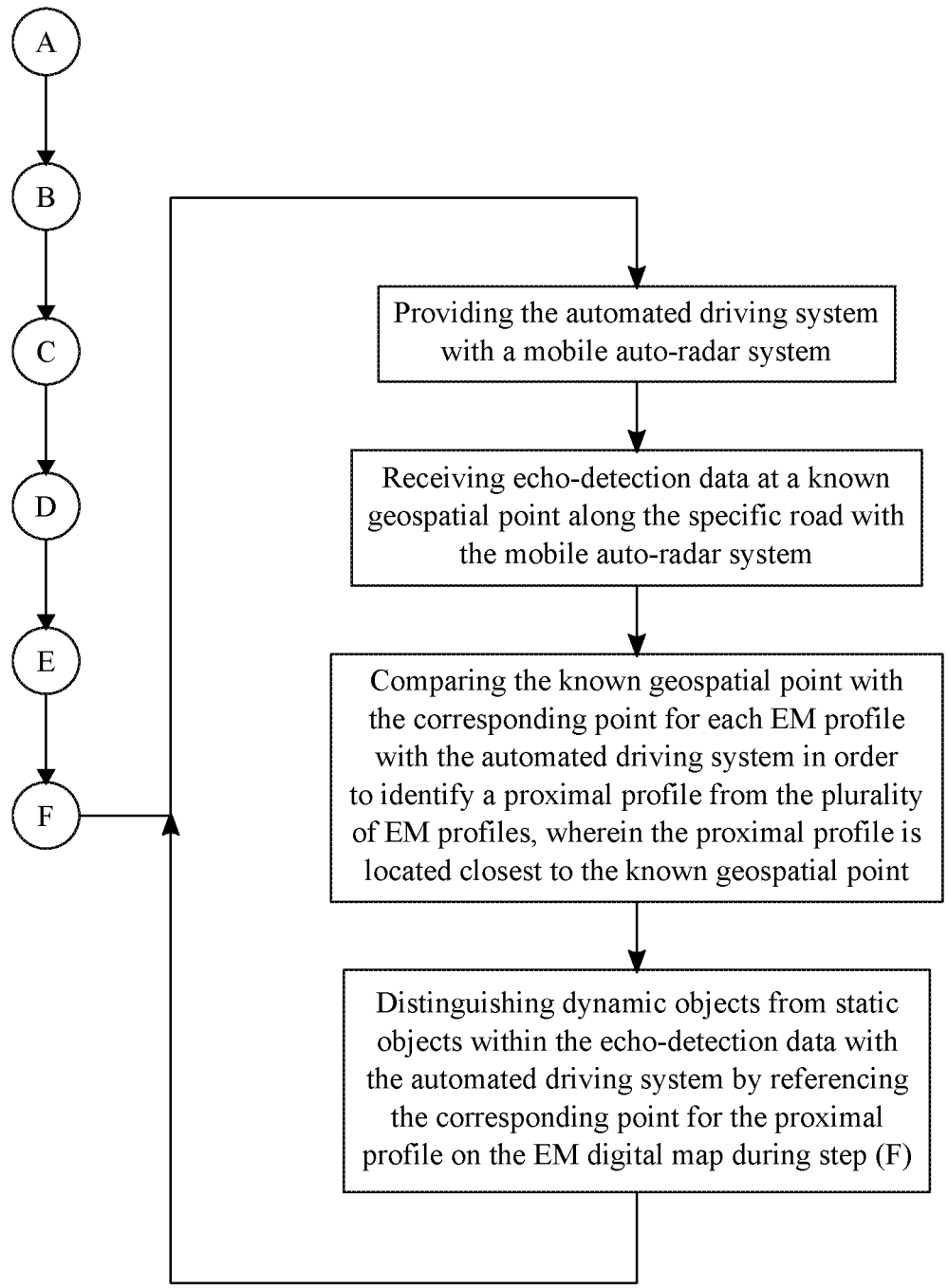
FIG. 18 is a flowchart illustrating the subprocess of distinguishing dynamic objects from static objects with a MIMO antenna.

The present invention may further be utilized to direct consumer vehicles, driving both automatically and manually. To achieve this, the automated driving system is provided with a mobile auto-radar system, as represented in FIG. 18. The mobile auto-radar system generates an updating map denoting all relevant objects. Echo-detection data is received at a known geospatial point along the specific road with the mobile auto-radar system. The echo-location data may be utilized to determine the presence or absence of relevant objects. The known geospatial point is compared with the corresponding point for each EM profile with the automated driving system in order to identify a proximal profile from the plurality of EM profiles, wherein the proximal profile is located closest to the known geospatial point. Thus, the automated driving system registers objects as being similar or dissimilar from existing or expected objects upon a given road. The automated driving system then distinguishes dynamic objects from static objects within the echo-detection data by referencing the corresponding point for the proximal profile on the EM digital map during Step F. Thus, the automated driving system can respond appropriately and distinctly in response to other vehicles, which would be filtered from the echo-location detection data, as opposed to road features, which have been mapped in the EM digital map.

Supplemental Description

An innovative EM Digital Map is our invention for V2X communication and automatic driving auto radar.

Figure 3:
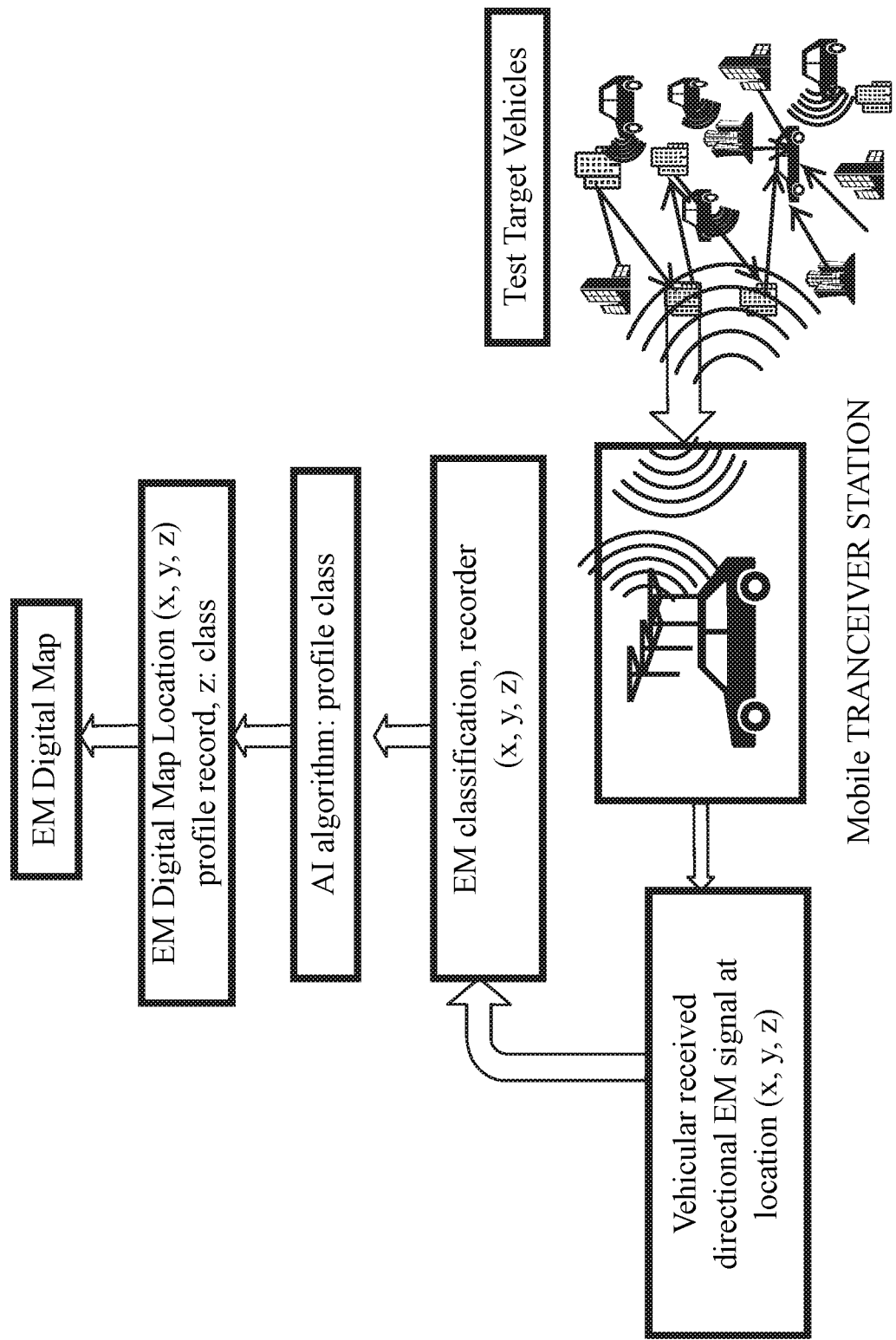
FIG. 3 is a schematic diagram illustrating the process of capturing each electromagnetic (EM) profile.

As can be seen in FIG. 3, the present invention will now be described as following: EM profile is built for a road point that is descript in a digital map as (X, Y), for each point in digital map a EM profile is built denote as $\mathscr{R}(x,y)$.

For a road location (x,y) the profile set $\mathscr{R}(x,y)$ contents:
  a. the receiving echo characters from cars in the same direction, ahead of radar distance ranger (1, 500) meter;
  b. echo characters from cars in the same direction, Behind of radar distance ranger (1, 500) meter;
  c. echo characters from cars in the same direction, but in adjacent lane (s) ahead of radar distance ranger (1, 500) meter;
  d. echo characters from cars in the opposite direction, but in adjacent lane (s) ahead of radar distance ranger (1, 500) meters;
  e. echo characters from cars in the opposite direction, but in adjacent lane (s) behind of radar distance ranger (1, 500) meters;
  f. The test scenario in covers many variables, such as number of surrounding cars in all lanes and all possible car number $N \in \{0, N\}$ in $M \in \{1, M\}$; and
  g. Typical multiple antenna array output is recorded and classified with corresponding geographical class.

Machine learning algorithms are used to construct EM propagation profile and to associate with a particular geographic class whose features are extracted by AI classification algorithm from digital map.

Figure 4:
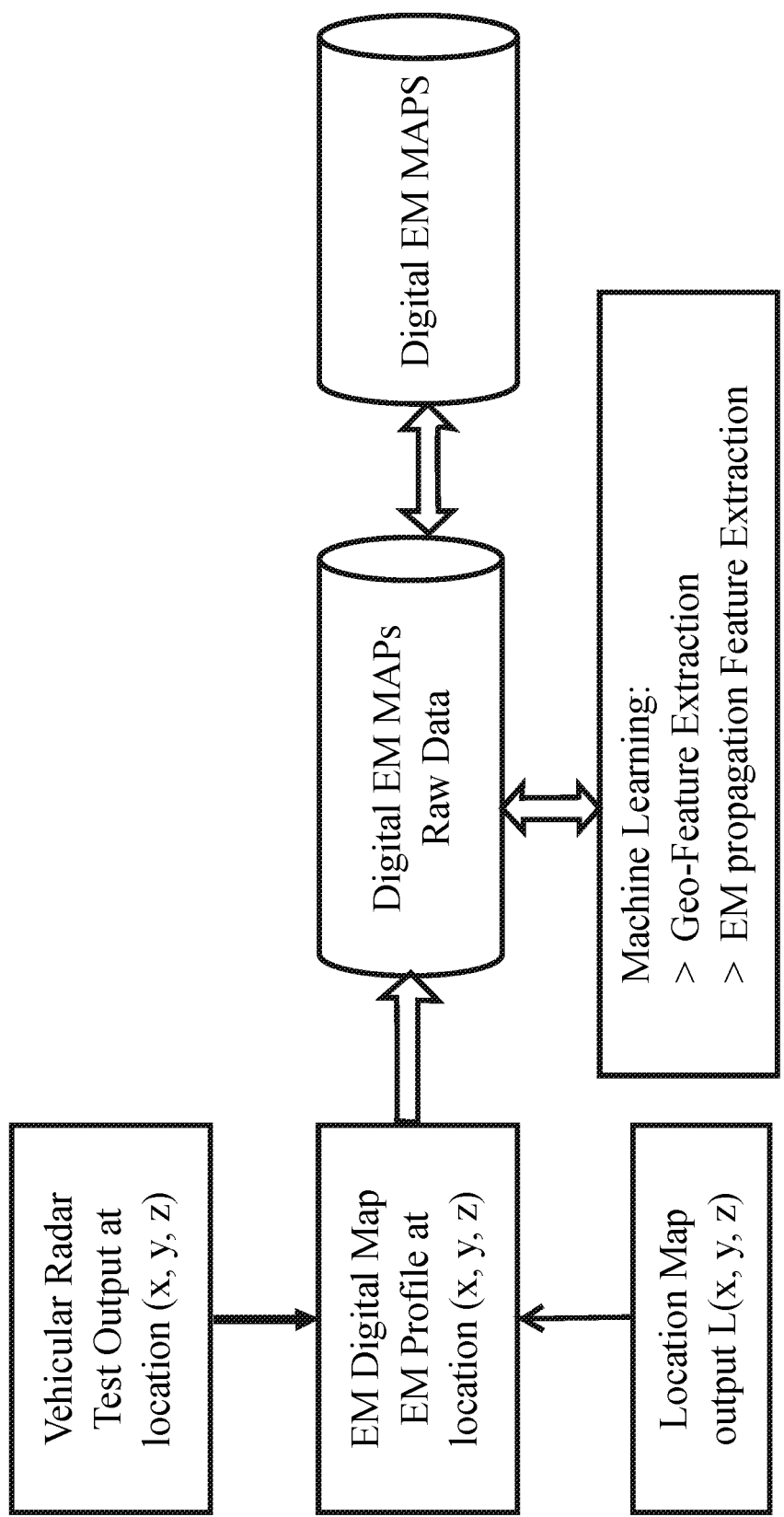
FIG. 4 is a schematic diagram illustrating the process of making the EM digital map.

As can be seen in FIG. 4, once enough road tests are accomplished and the EM geographic road class is available, further EM map construction would be much simplified. By verify and calibrate the class profile for the location (x,y) There for any road location, the Digital EM maps would be established. The EM digital map will be able to deduct the EM propagation profile without to do road test.

Road geophysical feature extraction is accomplished by AI machine learning to build a group of geographical features that are relevant and important to EM propagation, especially for millimeter wave and other wireless communication wavelength.

Figure 5:
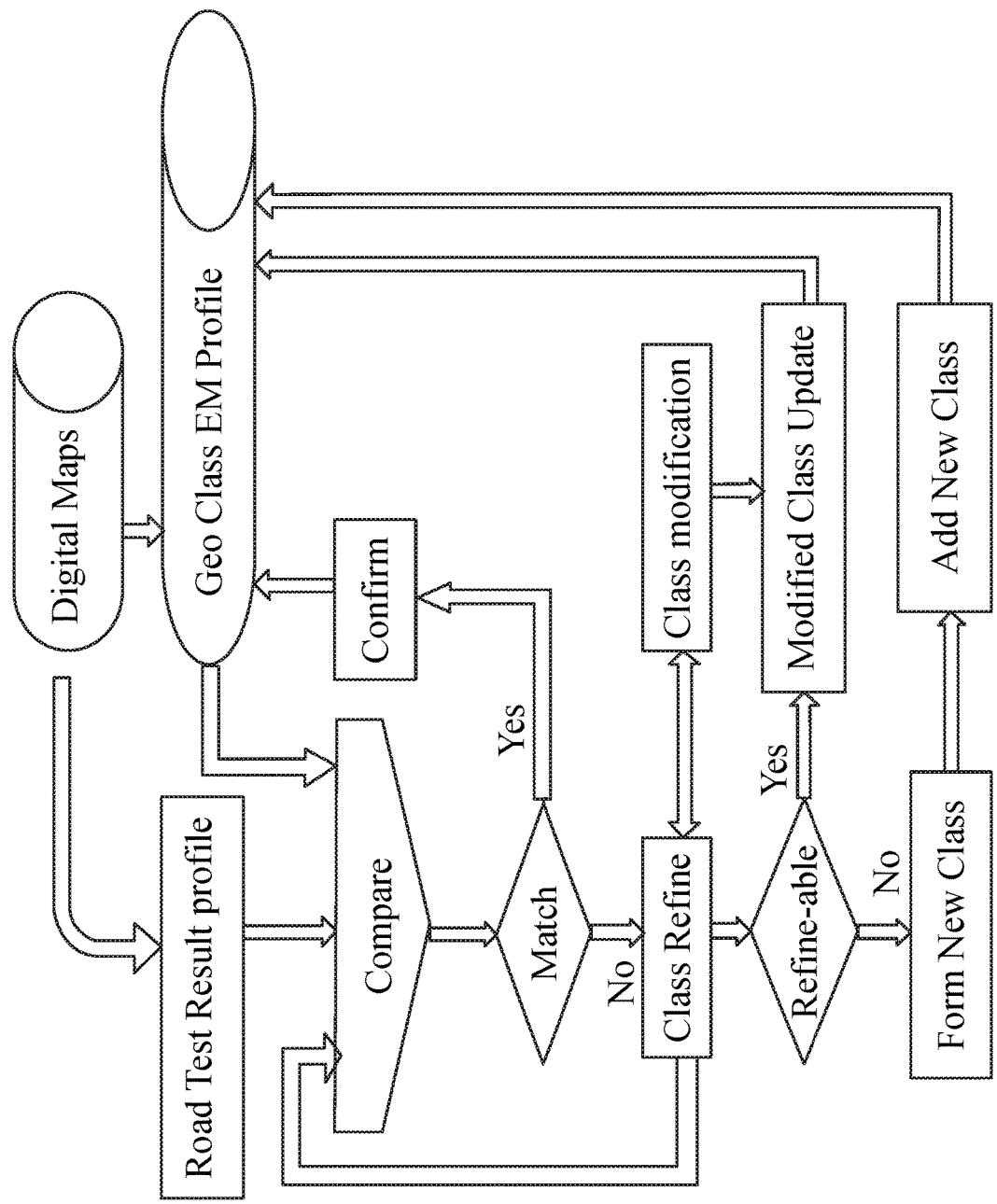
FIG. 5 is a schematic diagram illustrating the process of assigning a profile class.

As can be seen in FIG. 5, road test results for each geographic class is used to predict an EM profile class for each Geographical feature. It will be iteratively verified by real test data, modify the class profile, or created new class if the test results cannot fit into any built class. This is an iterative process to refine class definition, add new class by comparing test data and existing classes.

Figure 6:
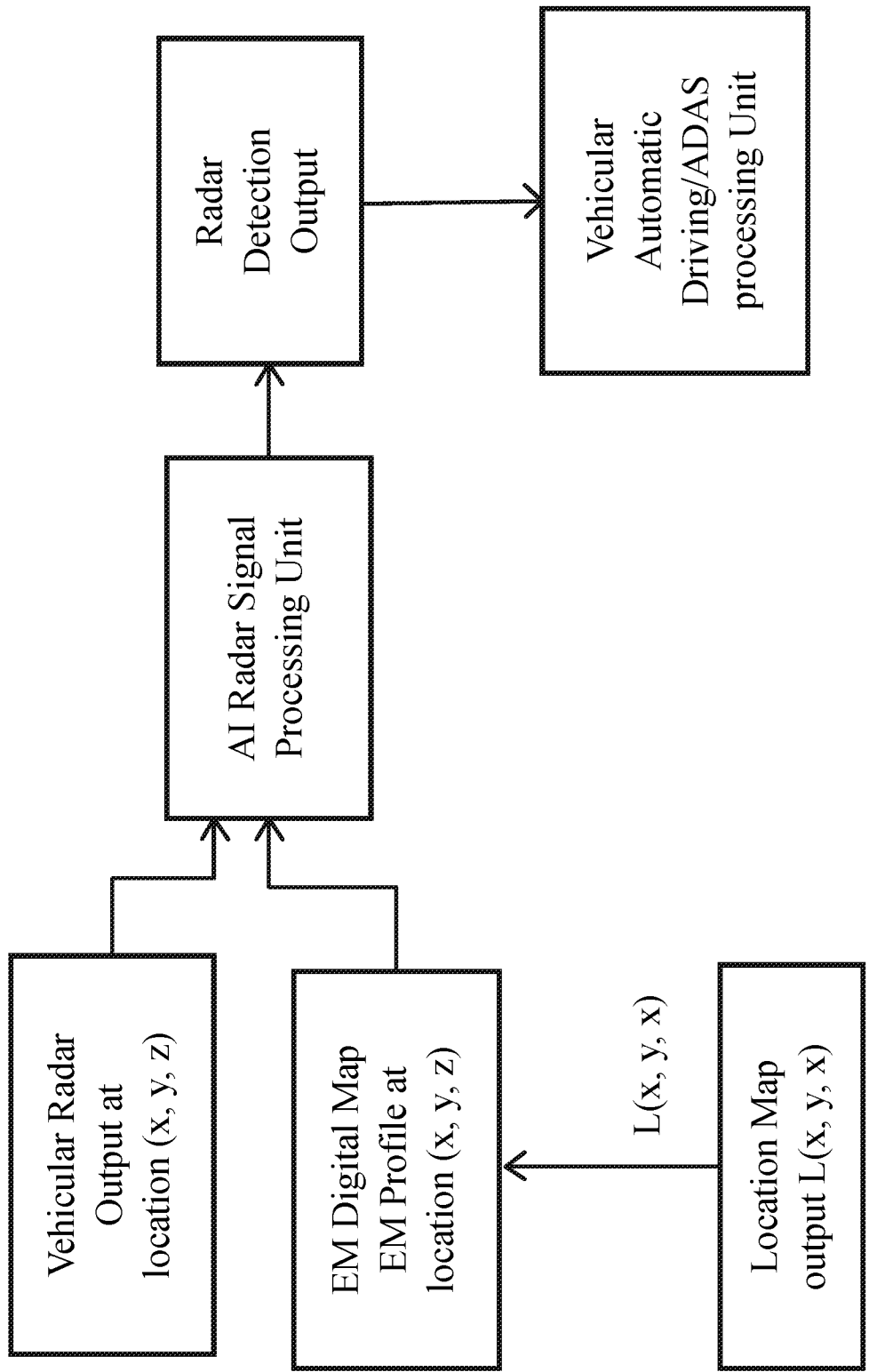
FIG. 6 is a schematic diagram illustrating the process of applying an artificial intelligence (AI) radar signal to the present invention.

As can be seen in FIG. 6, road geophysical feature extraction is accomplished by AI machine learning to build a group of geographical features that are relevant and important to EM propagation, especially for millimeter wave and other wireless communication wavelength. The EM propagation profile will be used in receiving and transmission by making the optimal beam pattern of MIMO transceiver and optimization the code and decode for the transceiver using the knowledge of multiphases and other EM wave propagation features at a particular location on the Digital EM maps. For the base station of wireless communication, such as 4G/5G wireless system, Digital EM profile will enable the base station or access point optimized MOMO transmission and receiving beam pattern, design optimal coding and decoding scheme, such as in OFDM coding cyclic symbol length etc.

The EM digital map will greatly improve detectability and accuracy of auto radar system. By comparing EM profile at the location and MIMO received signal matrix, the radar can instantaneously identify target cars locations and speeds in the radar range for this location. By comparing the output radar multiple antenna array receiver, the auto radar will be able to turn its beamforming by compare received signal with EM profile to determine the surrounding vehicles number and location and directions, then do fine tuning to get precise targets location and speed. In no direct pass radar echo detection situation, the EM Digital Maps play even more important role to make the detection possible.

Figure 7:
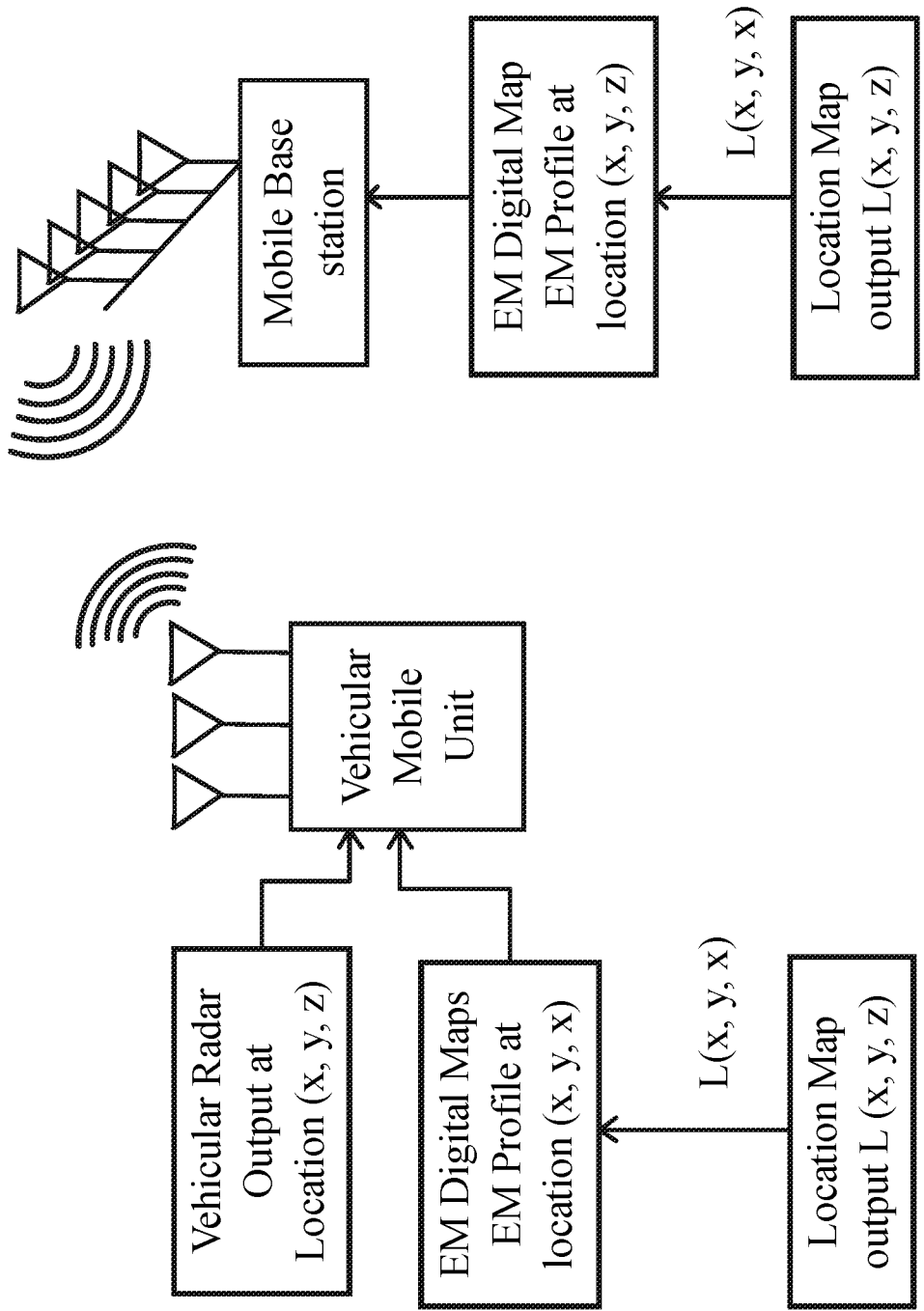
FIG. 7 is schematic diagram illustrating the process of applying vehicle-to-vehicle communication to the present invention.
Figure 8:
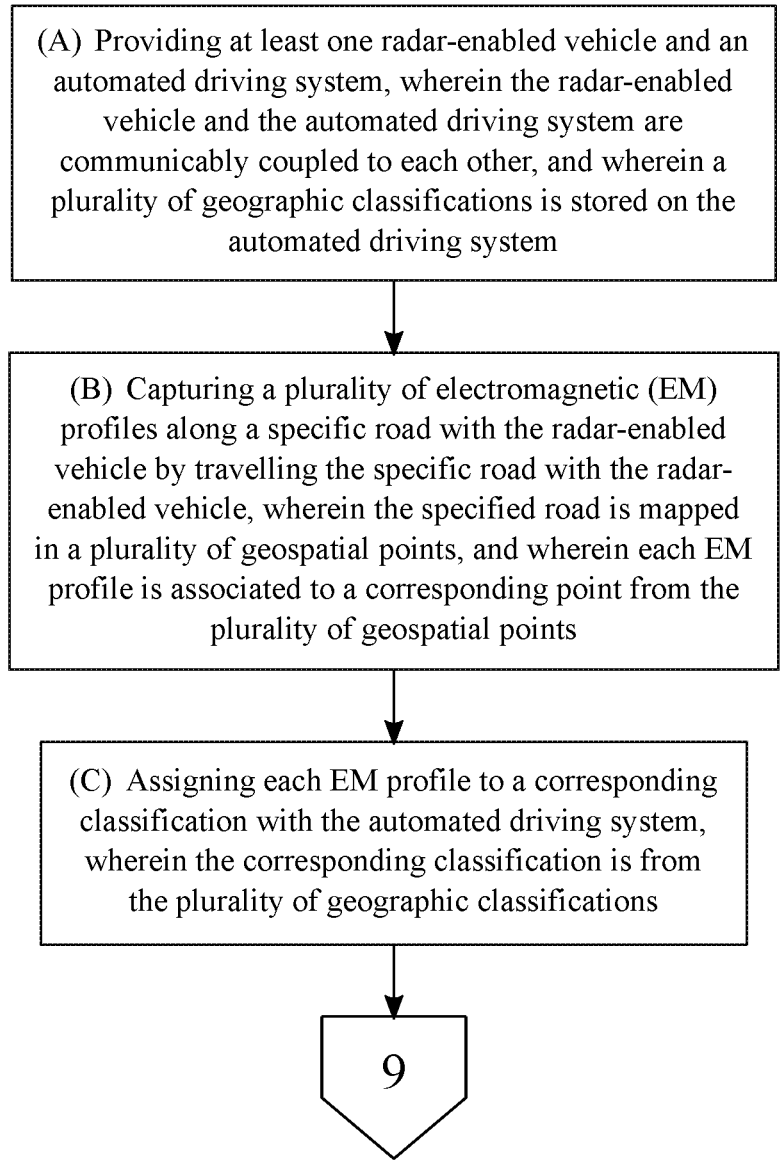
FIG. 8 is flowchart illustrating the overall process for the method of the present invention.
Figure 9:
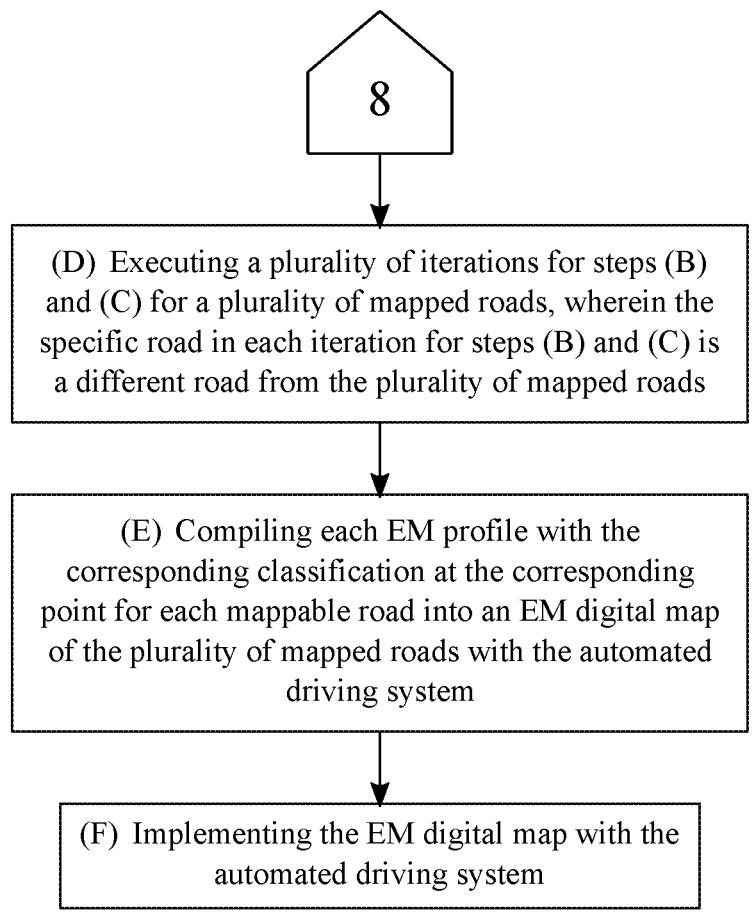
FIG. 9 is a continuation of FIG. 8.

As can be seen in the FIG. 7, the EM digital will greatly improve Vehicles to Vehicles communication liability and data rate: The EM propagation profile will be used in receiving and transmission by making the optimal beampattern of MINO transceiver and optimization the code and decode for the transceiver using the knowledge of multiphases and other EM wave propagation features at a particular location on the Digital EM maps. For each vehicle in the V2V communication link can dynamically optimize MIMO transmission and receiving beam pattern, design optimal coding and decoding scheme, such as in OFDM coding cyclic symbol length etc. Thus, communication reliability would be greatly improved to achieve higher data rate.

The EM digital will greatly improve V2X communication system capacity, liability and data rate. The EM propagation profile will be used in receiving and transmission by making the optimal beampattern of MINO transceiver and optimization the code and decode for the transceiver using the knowledge of multiphases and other EM wave propagation features at a particular location on the Digital EM maps. For the base station/access point of wireless communication, such as 4G/5G wireless system. Digital EM profile will enable the base station or access point optimized MOMO transmission and receiving beam pattern, design optimal coding and decoding scheme, such as in OFDM coding cyclic symbol length etc.

The EM digital will greatly improve Wi-Fi vehicles network system capacity and communication liability and data rate. The EM propagation profile will be used in receiving and transmission by making the optimal beampattern of MINO transceiver in both access point and terminal vehicle, and to optimize the code and decode for the transceiver using the knowledge of multiphases and other EM wave propagation features at a particular location on the Digital EM maps.

The EM digital will greatly improve 5G vehicles network communication liability and data rate. The EM propagation profile will be used in receiving and transmission by making the optimal beampattern of MINO transceiver and optimization the code and decode for the transceiver using the knowledge of multiphases and other EM wave propagation features at a particular location on the Digital EM maps. For the base station of wireless communication, such as 4G/5G wireless system, Digital EM profile will enable the base station or access point optimized MOMO transmission and receiving beam patent, design optimal coding and decoding scheme, such as in OFDM coding cyclic symbol length etc.

Although the invention has been explained in relation to its preferred embodiment, it is to be understood that many other possible modifications and variations can be made without departing from the spirit and scope of the invention as hereinafter claimed.

What is claimed is:

1. A method for generating an electromagnetic-profile digital map, the method comprises the steps of:
   (A) providing at least one radar-enabled vehicle and an automated driving system, wherein the radar-enabled vehicle and the automated driving system are communicably coupled to each other, and wherein a plurality of geographic classifications is stored on the automated driving system;
   (B) capturing a plurality of electromagnetic (EM) profiles along a specific road with the radar-enabled vehicle by travelling the specific road with the radar-enabled vehicle, wherein the specified road is mapped in a plurality of geospatial points, and wherein each EM profile is associated to a corresponding point from the plurality of geospatial points;
   (C) assigning each EM profile to a corresponding classification with the automated driving system, wherein the corresponding classification is from the plurality of geographic classifications;
   (D) executing a plurality of iterations for steps (B) and (C) for a plurality of mapped roads, wherein the specific road in each iteration for steps (B) and (C) is a different road from the plurality of mapped roads;
   (E) compiling each EM profile with the corresponding classification at the corresponding point for each mappable road into an EM digital map of the plurality of mapped roads with the automated driving system;
   (F) implementing the EM digital map with the automated driving system;
   providing the automated driving system with a mobile auto-radar system;
   receiving echo-detection data at a known geospatial point along the specific road with the mobile auto-radar system;
   comparing the known geospatial point with the corresponding point for each EM profile with the automated driving system in order to identify a proximal profile from the plurality of EM profiles, wherein the proximal profile is located closest to the known geospatial point; and
   distinguishing dynamic objects from static objects within the echo-detection data with the automated driving system by referencing the corresponding point for the proximal profile on the EM digital map during step (F).

2. The method for generating an electromagnetic-profile digital map, the method as claimed in claim 1 comprises the steps of:
   wherein the radar-enabled vehicle is travelling in a forward direction on a selected lane of the specific road during step (B);
   receiving a first set of echo data for each EM profile with the radar-enabled vehicle, wherein the first set of echo data is used to detect a vehicular presence travelling in the forward direction on the selected lane ahead of the radar-enabled vehicle; and
   receiving a second set of echo data for each EM profile with the radar-enabled vehicle, wherein the second set of echo data is used to detect a vehicular presence travelling in the forward direction on the selected lane behind the radar-enabled vehicle.

3. The method for generating an electromagnetic-profile digital map, the method as claimed in claim 2 comprises the steps of:
   wherein the specific road includes at least one adjacent lane to the selected lane;
   receiving a third set of echo data for each EM profile with the radar-enabled vehicle, wherein the third set of echo data is used to detect a vehicular presence travelling in the forward direction on the adjacent lane ahead of the radar-enabled vehicle; and
   receiving a fourth set of echo data for each EM profile with the radar-enabled vehicle, wherein the fourth set of echo data is used to detect a vehicular presence travelling in the forward direction on the adjacent lane behind the radar-enabled vehicle.

4. The method for generating an electromagnetic-profile digital map, the method as claimed in claim 2 comprises the steps of:
   wherein the specific road includes at least one adjacent lane to the selected lane;
   receiving a fifth set of echo data for each EM profile with the radar-enabled vehicle, wherein the fifth set of echo data is used to detect a vehicular presence travelling in an opposite direction on the adjacent lane ahead of the radar-enabled vehicle; and
   receiving a sixth set of echo data for each EM profile with the radar-enabled vehicle, wherein the sixth set of echo data is used to detect a vehicular presence travelling in the opposite direction on the adjacent lane behind of the radar-enabled vehicle.

5. The method for generating an electromagnetic-profile digital map, the method as claimed in claim 1 comprises the steps of:
   (G) comparing a specific profile to each geographical classification with the automated driving system during step (C) in order to identify a matching classification from the plurality of geographical classifications, wherein the specific profile is from the plurality of EM profiles;
   (H) assigning the matching classification as the corresponding classification for the specific profile with the automated driving system, when the matching classification is identified by the automated driving system; and (K) executing a plurality of iterations for step (H), wherein the specific profile in each iteration is a different profile from the plurality of EM profiles.

6. The method for generating an electromagnetic-profile digital map, the method as claimed in claim 5 comprises the steps of:
providing a matching threshold managed by the automated driving system;
assessing a profile-similarity score between the matching classification and the specific profile with the automated driving system; and
updating the matching classification with a modification based on the specific profile with the automated driving system, when the profile-similarity score is less than or equal to the matching threshold.

7. The method for generating an electromagnetic-profile digital map, the method as claimed in claim 1 comprises the steps of:
providing the automated driving system with at least one multiple-input multiple-output (MIMO) antenna; and
configuring a signature scanning beam of the MIMO antenna with the automated driving system by referencing the EM digital map during step (F).

8. The method for generating an electromagnetic-profile digital map, the method as claimed in claim 1 comprises the steps of:
providing the automated driving system with at least one multiple-input multiple-output (MIMO) antenna;
comparing a geospatial detection range of the MIMO antenna to the corresponding point for each EM profile with the automated driving system in order to identify at least one proximal profile from the plurality of EM profiles, wherein the proximal profile is located within the geospatial detection range; and
optimally orienting a signature scanning beam of the MIMO antenna with the automated driving system by referencing the corresponding point for the proximal profile on the EM digital map during step (F).

9. The method for generating an electromagnetic-profile digital map, the method as claimed in claim 1 comprises the steps of:
providing the automated driving system with at least one multiple-input multiple-output (MIMO) antenna;
comparing a geospatial detection range of the MIMO antenna to the corresponding point for each EM profile with the automated driving system in order to identify at least one proximal profile from the plurality of EM profiles, wherein the proximal profile is located within the geospatial detection range; and
optimizing a coding-and-decoding process for a signature scanning beam of the MIMO antenna with the automated driving system by referencing the corresponding point for the proximal profile on the EM digital map during step (F).

10. The method for generating an electromagnetic-profile digital map, the method as claimed in claim 1 comprises the steps of:
(G) comparing a specific profile to each geographical classification with the automated driving system during step (C) in order to identify a matching classification from the plurality of geographical classifications, wherein the specific profile is from the plurality of EM profiles;
(I) appending the specific profile into the geographical classifications as a new classification with the automated driving system, and assigning the new classification as the corresponding classification for the specific profile with the automated driving system, when the matching classification is not identified by the automated driving system; and
(K) executing a plurality of iterations for step (I), wherein the specific profile in each iteration is a different profile from the plurality of EM profiles.

11. The method for generating an electromagnetic-profile digital map, the method as claimed in claim 10 comprises the steps of:
providing a matching threshold managed by the automated driving system;
assessing a profile-similarity score between the matching classification and the specific profile with the automated driving system; and
updating the matching classification with a modification based on the specific profile with the automated driving system, when the profile-similarity score is less than or equal to the matching threshold.

* * * * *